United States Patent
Panje

(10) Patent No.: US 10,455,292 B2
(45) Date of Patent: Oct. 22, 2019

(54) DYNAMIC CHANNEL LIST GENERATION FOR CONTENT DELIVERY OVER DLNA

(71) Applicant: ARRIS Enterprises LLC, Suwanee, GA (US)

(72) Inventor: Krishna Prasad Panje, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/164,339

(22) Filed: May 25, 2016

(65) Prior Publication Data

US 2016/0353134 A1     Dec. 1, 2016

Related U.S. Application Data

(60) Provisional application No. 62/169,052, filed on Jun. 1, 2015.

(51) Int. Cl.

| | |
|---|---|
| *H04N 21/482* | (2011.01) |
| *H04L 29/06* | (2006.01) |
| *H04N 5/44* | (2011.01) |
| *H04N 5/50* | (2006.01) |
| *H04N 21/426* | (2011.01) |
| *H04N 21/436* | (2011.01) |

(Continued)

(52) U.S. Cl.
CPC ....... *H04N 21/482* (2013.01); *H04L 65/4069* (2013.01); *H04L 65/60* (2013.01); *H04N 5/4401* (2013.01); *H04N 5/50* (2013.01); *H04N 21/4263* (2013.01); *H04N 21/4383* (2013.01); *H04N 21/43615* (2013.01); *H04L 67/02* (2013.01)

(58) Field of Classification Search
CPC ...... H04N 21/482; H04N 5/4401; H04N 5/50; H04N 21/4263; H04N 21/43615; H04N 21/4383; H04L 65/60; H04L 67/02
See application file for complete search history.

(56) References Cited

U.S. PATENT DOCUMENTS

| | | | |
|---|---|---|---|
| 6,405,372 B1 * | 6/2002 | Kim | H04N 5/44543 348/553 |
| 2007/0088675 A1 * | 4/2007 | Duncan | |
| 2007/0156719 A1 * | 7/2007 | Upendran | G06F 16/9535 |

(Continued)

OTHER PUBLICATIONS

Debique at al., ContentDirectory:1 Service Template Version 1.01, Jun. 25, 2002.*

*Primary Examiner* — Hai V Tran
(74) *Attorney, Agent, or Firm* — Bart A. Perkins

(57) ABSTRACT

Methods, systems, and computer readable media can be operable to facilitate the generation and/or update of a channel directory on a per channel basis for output to a device. In embodiments, a multimedia device may generate and update a channel directory using one or more channel attributes that are retrieved while tuned to each individual one channel of a group of channels. The multimedia device may generate and update the channel directory as one or more background operations by using a free tuner to tune to each channel. The multimedia device may position each channel within the channel directory according to one or more attributes associated with the channel. In embodiments, the multimedia device may update the channel directory when a tuner is actively tuned to a channel and the determination is made that one or more attributes of the channel have changed.

14 Claims, 5 Drawing Sheets

(51) Int. Cl.
*H04N 21/438* (2011.01)
*H04L 29/08* (2006.01)

(56) References Cited

U.S. PATENT DOCUMENTS

| | | | | |
|---|---|---|---|---|
| 2007/0214474 | A1* | 9/2007 | McClenny | H04N 5/4403 725/31 |
| 2007/0250870 | A1* | 10/2007 | Kim | H04N 21/43615 725/81 |
| 2008/0010656 | A1* | 1/2008 | Cho | H04N 5/44543 725/40 |
| 2009/0031144 | A1* | 1/2009 | Williams | H04N 21/2585 713/193 |
| 2009/0193101 | A1* | 7/2009 | Munetsugu | G11B 27/034 709/219 |
| 2014/0115721 | A1* | 4/2014 | Shan | H04L 63/083 726/27 |
| 2017/0078766 | A1* | 3/2017 | Wen | H04N 21/431 |

* cited by examiner

DYNAMIC CHANNEL LIST GENERATION FOR CONTENT DELIVERY OVER DLNA

CROSS REFERENCE TO RELATED APPLICATION

This application is a non-provisional application claiming the benefit of U.S. Provisional Application Ser. No. 62/169,052, entitled "CPE to DLNA Client Streaming," which was filed on Jun. 1, 2015, and is incorporated herein by reference in its entirety.

TECHNICAL FIELD

This disclosure relates to delivering content to a client device over a Digital Living Network Alliance (DLNA) connection.

BACKGROUND

The advent of networked client devices (e.g., devices that are connected to a common network), such as Digital Living Network Alliance (DLNA) devices, within the home has created a mixture of different interfaces through which subscribers may consume multimedia. Once connected to a network, networked client devices can communicate and interact with each other, and networked client devices can be capable of providing a user interface that allows a user to cause a set-top box (STB) to tune to a specific channel according to a request from the user. In embodiments, networked client devices transmit a request to a STB by sending a uniform resource identifier (URI) (e.g., a character string identifying a specific web and/or network resource).

Customer premise equipment (CPE) devices such as gateway products provide Internet protocol (IP) Digital Living Network Alliance (DLNA) streaming of content to IP client STBs within a premise. The content can be live (linear) or recorded and may be designated by a uniform resource identifier (URI). The typical channel tuning by an IP client is achieved by doing a HTTP Get on a published URI by the gateway. Gateways as well as IP high-definition (HD) set top boxes (STB) can also stream content to standard retail IP clients (e.g., gaming devices, tablets, mobile devices, etc.) using DLNA. In general, STBs may be required to offer media transport with discovery and remote control pass through using open industry standards for home networking. For example, CPE devices such as HD STBs/gateways may be required to source content streams to networked devices using open standards (e.g., DLNA).

Typically, because of the wide variety of potential differences between client devices, many issues are encountered when attempting to implement DLNA streaming from CPE devices to one or more client devices. For example, where STB applications do not change or guide data is unavailable to the middleware, the STB platform has to offer the channel list, and because the platform has no knowledge of program information such as name and other guide data information, the STB provides a simple grouping of channels in a content directory service (CDS) directory folder containing channel identifiers grouped according to channel numbers (e.g., channel "number 1-100", "number 100-200" till the end of channel list in a virtual channel number (VCN) list or other list of channel numbers listed sequentially in a single folder). Each folder typically contains a link to a channel number, which when requested by a client device, forces the STB to tune and start a HTTP streaming to that client device.

The current systems and methods utilized for the provisioning of channel information to client devices has created various issues. For one, the channel VCN list populated by the STB platform to a client device may have channels that are not authorized to the client (e.g., channels provided in high-definition format, pay-per view channels, channels that are not subscribed to by the client, channels blocked by security/parental settings, etc.). Thus, when a user tunes to the channel from the client device, the STB fails to tune to that channel and the user of the client device is not made aware of the reason for the channel tuning failure. As another example, the channel VCN list populated by the STB platform to a client device may include one or more invalid channels. Further, in some cases, the guide channel numbers also may be rearranged, thereby leading to tuning failures at the STB. As yet another example of an issue caused by the lack of guide information available for DLNA streaming, a client device may be precluded from tuning to a parentally locked channel (as STB platform is unaware of parental PINs). Because the STB platform likely is not aware of which channels are valid for a subscriber or user, the currently used method of listing all VCN entries leads to a poor user experience on client devices such as gaming devices, mobile phones, tablets, and others. For example, a user may become frustrated when having to scroll through the user interface of the client to reach a desired channel, especially when many of the listed channels (e.g., VCNs) are unavailable to the client device.

The lack of information may lead to other issues when determining whether content must be encrypted. For example, encryption is done if copy control information (CCI) value is more than zero. Without notifying client devices of the encryption status of channels, client devices which do not support digital transmission content protection (DTCP) may quit requesting content after first browsing the channel entries on a STB CDS. This eliminates several client devices from accessing a DLNA stream from a STB. Further, if a client device is DTCP-capable, the client device may anticipate that the content is DTCP encrypted, and thus begin a handshake with the STB even if the content is copy free. These behaviors are client implementation dependent. Because CCI rights of a channel are not made known prior to tuning to a channel, many retail clients which do not support DTCP, will not start streaming with a STB.

Therefore, a need exists for a STB solution wherein easy channel browsing is enabled, while also increasing client device coverage by denoting appropriate DTCP notation.

BRIEF DESCRIPTION OF THE DRAWINGS

Like reference numbers and designations in the various drawings indicate like elements.

DETAILED DESCRIPTION

Figure 1:
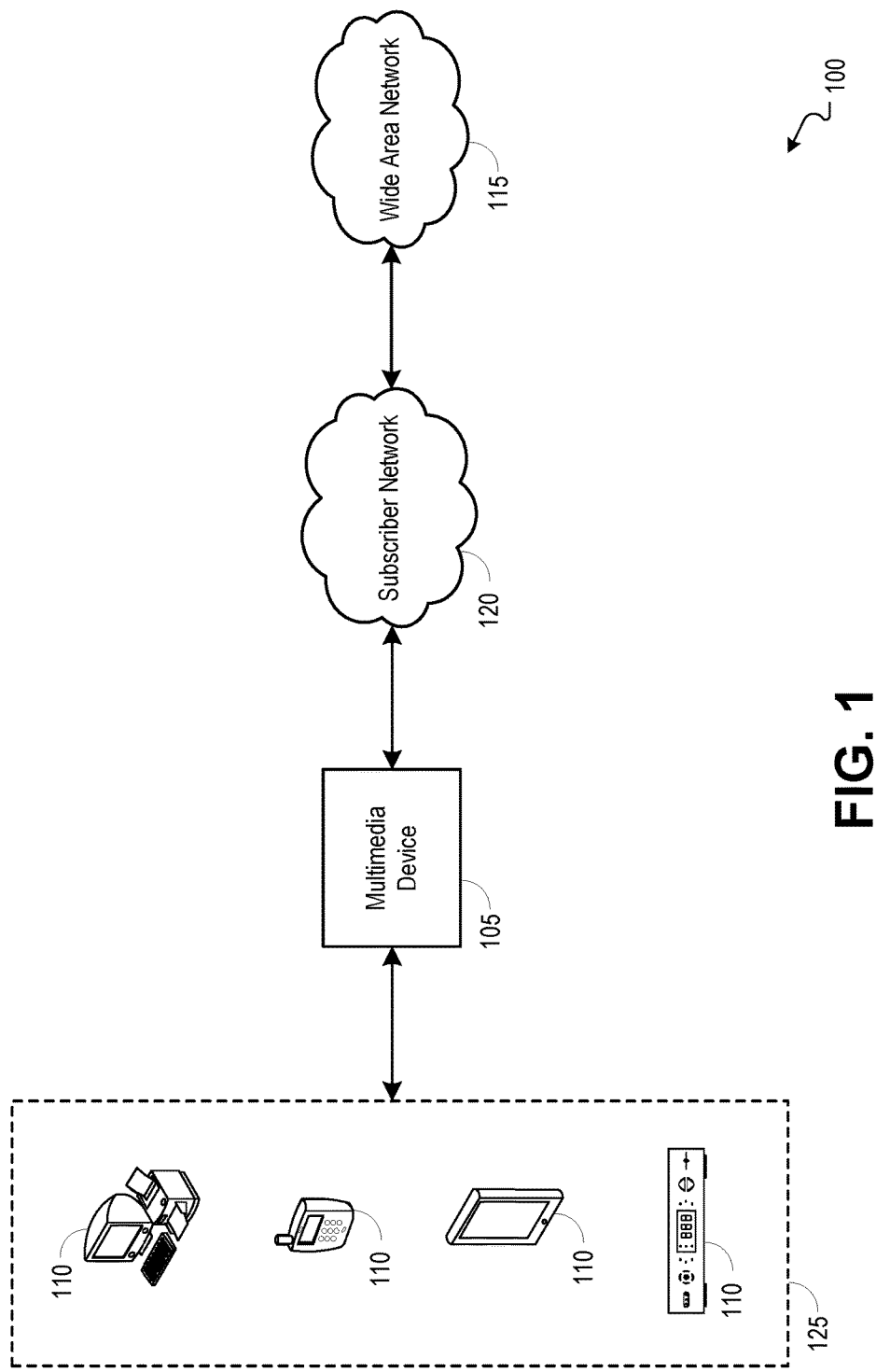
FIG. 1 is a block diagram illustrating an example network environment operable to facilitate the generation and/or update of a channel directory on a per channel basis for output to a device.

It is desirable to improve upon methods and systems for providing client devices with information associated with a channel directory. Methods, systems, and computer readable media can be operable to facilitate the generation and/or update of a channel directory on a per channel basis for output to a device. In embodiments, a multimedia device may generate and update a channel directory using one or more channel attributes that are retrieved while tuned to each individual one channel of a group of channels. The multimedia device may generate and update the channel directory as one or more background operations by using a free tuner to tune to each channel. The multimedia device may position each channel within the channel directory according to one or more attributes associated with the channel. In embodiments, the multimedia device may update the channel directory when a tuner is actively tuned to a channel and the determination is made that one or more attributes of the channel have changed.

An embodiment of the invention described herein may include a method comprising: (a) determining that a tuner of a multimedia device is available; (b) tuning the tuner to a channel identified from a list of channels; (c) while the tuner is tuned to the identified channel, determining one or more properties associated with the identified channel; (d) organizing the location of the identified channel relative to one or more other channels within a content directory based upon one or more of the one or more properties; and (e) publishing the content directory to one or more client devices.

According to an embodiment of the invention, the tuner is tuned to the identified channel as a background operation.

According to an embodiment of the invention, the one or more properties associated with the identified channel comprise an indication of the availability of the identified channel for playback at a client device.

According to an embodiment of the invention, organizing the location of the identified channel within a content directory comprises positioning an identifier of the identified channel underneath a heading corresponding with at least one of the determined one or more properties of the identified channel.

According to an embodiment of the invention, each channel within the content directory is published as being protected.

According to an embodiment of the invention, each channel within the content directory is published as being unprotected.

According to an embodiment of the invention, the determined one or more properties associated with the identified channel comprise copy control information, and a subsequent determination whether to stream content from a channel within the directory to a client device is based upon the copy control information.

According to an embodiment of the invention, the method described herein further comprises: (a) receiving a user request to tune to a certain channel; (b) tuning a tuner to the certain channel; (c) while the tuner is tuned to the certain channel, determining one or more properties associated with the certain channel; (d) comparing one or more of the determined one or more properties associated with the certain channel to one or more previously determined properties associated with the certain channel; and (e) if one or more determined properties are different from one or more previously determined properties associated with the certain channel, updating the one or more properties of the certain channel within the content directory using the one or more determined properties.

An embodiment of the invention described herein may include an apparatus comprising: (a) one or more tuners, wherein each respective one tuner is configured to be tuned to receive a signal associated with a designated channel; and (b) a content directory module configured to: (i) determine that at least one of the one or more tuners is available; (ii) tune the available tuner to a channel identified from a list of channels; (iii) while the available tuner is tuned to the identified channel, determine one or more properties associated with the identified channel; (iv) organize the location of the identified channel relative to one or more other channels within a content directory based upon one or more of the one or more properties; and (v) publish the content directory to one or more client devices.

According to an embodiment of the invention, the apparatus described herein further comprises: (a) an interface configured to be used to receive a user request to tune to a certain channel; and (b) wherein the content directory module is further configured to: (i) tune one of the one or more tuners to the certain channel; (ii) while the tuner is tuned to the certain channel, determine one or more properties associated with the certain channel; (iii) compare one or more of the determined one or more properties associated with the certain channel to one or more previously determined properties associated with the certain channel; and (iv) if one or more determined properties are different from one or more previously determined properties associated with the certain channel, update the one or more properties of the certain channel within the content directory using the one or more determined properties.

An embodiment of the invention described herein may include one or more non-transitory computer readable media having instructions operable to cause one or more processors to perform the operations comprising: (a) determining that a tuner of a multimedia device is available; (b) tuning the tuner to a channel identified from a list of channels; (c) while the tuner is tuned to the identified channel, determining one or more properties associated with the identified channel; (d) organizing the location of the identified channel relative to one or more other channels within a content directory based upon one or more of the one or more properties; and (e) publishing the content directory to one or more client devices.

According to an embodiment of the invention, the instructions are further operable to cause the one or more processors to perform the operations comprising: (a) receiving a user request to tune to a certain channel; (b) tuning a tuner to the certain channel; (c) while the tuner is tuned to the certain channel, determining one or more properties associated with the certain channel; (d) comparing one or more of the determined one or more properties associated with the certain channel to one or more previously determined properties associated with the certain channel; and (e) if one or more determined properties are different from one or more previously determined properties associated with the certain channel, updating the one or more properties of the certain channel within the content directory using the one or more determined properties.

FIG. 1 is a block diagram illustrating an example network environment 100 operable to facilitate the generation and/or update of a channel directory on a per channel basis for output to a device. In embodiments, one or more multimedia devices 105 (e.g., set-top box (STB), multimedia gateway device, DLNA multimedia device, etc.) may provide video, data and/or voice services to one or more client devices 110 by communicating with a wide area network (WAN) 115 through a connection to a subscriber network 120 (e.g., a local area network (LAN), a wireless local area network (WLAN), a personal area network (PAN), mobile network, high-speed wireless network, etc.). For example, a subscriber can receive and request video, data and/or voice services through a variety of types of client devices 110, including but not limited to a television, computer, tablet, mobile device, STB, and others. It should be understood that a multimedia device 105 may communicate directly with, and receive one or more services directly from a subscriber network 120 or WAN 115. A client device 110 may receive the requested services through a connection to a multimedia device 105, through a direct connection to a subscriber network 120 (e.g., mobile network), through a direct connection to a WAN 115, or through a connection to a local network 125 that is provided by a multimedia device 105 or other access point within an associated premise. While the components shown in FIG. 1 are shown separate from each other, it should be understood that the various components can be integrated into each other.

In embodiments, video services can be delivered from a multimedia device 105 to a client device 110 via DLNA streaming using HTTP. Using DLNA streaming, a single multimedia source file may be encoded and output as a single stream with varying bit rates. The bit rate may indicate the number of bits used per unit of playback time of the associated multimedia content. For example, the bit rate of a stream may be based upon the quality of the content rendition carried by the stream (e.g., higher quality rendition of content is streamed at a higher bit rate while lower quality rendition of content is streamed at a lower bitrate). Factors affecting the quality of content carried by a stream may include resolution, sampling frequency, encoding schemes, compression algorithms, and others.

In embodiments, client devices 110 may request and receive content from a multimedia device 105. Content available on a multimedia device 105 (e.g., live channels, stored content, etc.) can be exposed to and identified by client devices 110 using a channel or content directory (e.g., content directory service (CDS)). For example, a client device 110 may receive a channel or content directory and a subscriber can browse the directory for available channels or content. Using the content directory, a subscriber may select a channel or content for delivery from a multimedia device 105 to a client device 110. A requested channel or piece of content may be delivered to and received by a client device 110 via one or more frequencies associated with a program and/or one or more Internet protocol (IP) packet streams. As an example, a client device 110 may request channels or content from a multimedia device 105 by transmitting uniform resource identifier (URI) requests (e.g., Hypertext Transfer Protocol (HTTP) "get" request) to the multimedia device 105, the URI requests being associated with specific channels or content available at the multimedia device 105.

In embodiments, a multimedia device 105 may use a CDS to identify a channel number and corresponding frequency through which to receive a program or content associated with a URI request received from a client device 110. For example, the CDS may associate a URI request with a virtual channel number (VCN) that is designated for identifying a specific channel or frequency to which a tuner of the multimedia device 105 may be tuned for receiving content delivered over the specific channel or frequency.

In embodiments, a multimedia device 105 may be configured to carry out a prime and update method for generating and/or updating a channel directory. This prime and update method may be carried out by the multimedia device 105 as a background operation (e.g., as one or more tuners become available). When DLNA is enabled on the multimedia device 105, the multimedia device 105 may use any available (e.g., unused or free) tuner to tune to each of the channels in a virtual channel number (VCN) list one by one. Once tuned to a channel, the multimedia device 105 may determine the validity, authorization, rights information, media format, media details, and/or various other information or properties associated with the channel. The multimedia device 105 may then use the determined properties of each channel when listing each channel in a content directory service (CDS) directory item. When listing each channel in the CDS directory, the multimedia device 105 may use one or more of the properties of each respective channel to position the respective channel in an appropriate directory (as opposed to a linear listing). As an example, if a channel is determined to be invalid or tuning to the channel fails, the channel may be listed within the CDS directory under an "Invalid" or "Failed" heading or sub-heading. As another example, the channel may be listed under a heading or sub-heading designated for a media or format type associated with the channel (e.g., high-definition, standard definition, audio, etc.). It should be understood that the channel may be listed within the CDS directory under various other heading or sub-heading designations associated with a variety of channel attributes.

In embodiments, the multimedia device 105 may be configured to carry out a learn, update, and publish method of generating and/or updating a channel directory. The learn, update, and publish method may be carried out by the multimedia device 105 as a foreground operation (e.g., information is gathered as a tuner is actively tuned to a channel). Using the learn, update, and publish method, no background tuner is used. Once a particular channel is successfully tuned by a client device 110 through a tuner of the multimedia device 105 all channel attributes (e.g., validity, authorization, rights information, media format, media details, and/or various other information or properties associated with the channel) are determined, and the multimedia device 105 may position the channel in an appropriate directory (instead of a linear listing) based on one or more of the properties of the channel. As an example, when the user tunes to a parentally controlled channel, the audio/video of the channel may be muted until the user inputs a valid password or PIN. Once a valid password or PIN is input by the user, the multimedia device 105 may unmute the audio/video of the channel, and the multimedia device 105 may add or update the position of the channel within the CDS directory. For example, the channel may be positioned within a "Restricted," or similar heading/sub-heading designated for password protected content/channels. The multimedia device 105 may publish a standard CDS update event and one or more client devices 110 can reload the CDS to retrieve the updated listing of channels.

The one or more attributes or properties determined for a channel may be stored persistently at the multimedia device 105, or other device. When a tuner is tuned to a channel, the multimedia device 105 may retrieve current attributes or properties from the channel, and the current attributes or properties may be compared to the stored attributes or properties. If any changes between the current and the stored properties exist, the multimedia device 105 may update the stored channel properties and may publish a standard CDS update event. In response to receiving a CDS update event, the one or more client devices 110 may reload the CDS directory to retrieve the updated listing of channels.

In embodiments, the multimedia device 105 may be configured to operate according to a platform-based setting when DLNA is enabled. For example, a first setting may provide that all channels are published by the multimedia device 105 as being protected (this may be the default setting of the multimedia device 105). Under this first setting, all channels are indicated as protected channels in the CDS directory, thereby allowing client devices 110 that are capable of digital transmission content protection (DTCP) to retrieve and play the content retrieved over the channels. A second setting may provide that all channels are published as unprotected, but controlled before streaming. This second setting may be set on the multimedia device 105 for client devices 110 that do not support DTCP. For example, if a client device 110 is unable to retrieve/play content while the multimedia device 105 is operating under the first setting, the operation of the multimedia device 105 may be switched to operate under the second setting. According to the second setting, the multimedia device 105 may first tune to a requested channel, and if the channel is of low value content (e.g., copy control information (CCI) is zero), the multimedia device 105 may stream the content to a requesting client device 110 without any DTCP. Alternatively, if the channel is of high value content (e.g., CCI more than zero), then the multimedia device 105 may refrain from streaming the content to the requesting client device 110, and the multimedia device 105 may update the CDS directory with a proper attribute (e.g., high value content). It should be understood that the methods of channel list generation and updating described herein may be carried out on a per client device basis, such that each client device 110 can view the content that is retrievable/playable.

In embodiments, the multimedia device 105 may respond to a channel request (e.g., HTTP HEAD request) with a fourth field of protocolInfo for any item. This info may be used by a client device 110 to identify the media format or profile associated with the content for enabling playback of the content. In embodiments, if a protocolInfo value has "http-get" as the first field value and the fourth field includes the pn-param token, then the following syntax may be used for the fourth field: 4th field=pn-param [op-param] [ps-param] [ci-param] [flags-param] [*(other-param)]; DLNA.ORG_PN=media profile (DTCP_MPEG_TS_NA_ISO)>. The multimedia device 105 may replace the multipurpose Internet mail extensions (MIME) type "video/mpeg" with "application/x dtcp1;DTCP1HOST=<host>;DTCP1PORT=<port>;CONTENTFORMAT=video/mpeg."

Figure 2:
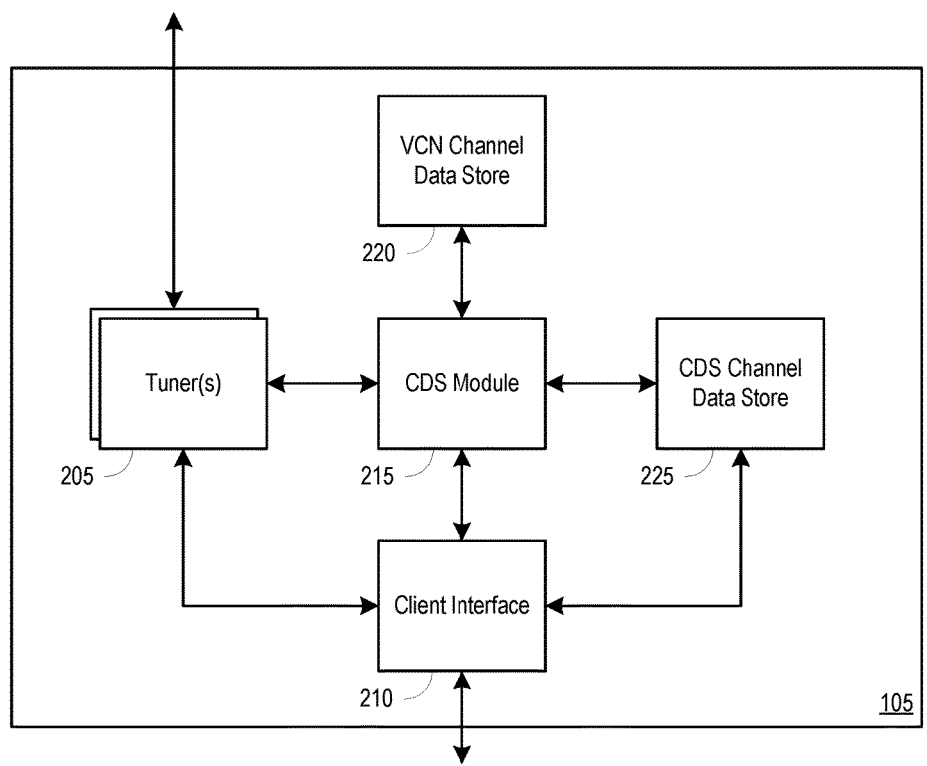
FIG. 2 is a block diagram illustrating an example multimedia device operable to facilitate the generation and/or update of a channel directory on a per channel basis for output to a device.

FIG. 2 is a block diagram illustrating an example multimedia device 105 operable to facilitate the generation and/or update of a channel directory on a per channel basis for output to a device. The multimedia device 105 may include one or more tuners 205, a client interface 210, a CDS module 215, a VCN channel data store 220, and a CDS channel data store 225.

In embodiments, each of one or more tuners 205 may be tuned to a channel to receive content carried over the channel. For example, each tuner 205 may be tuned to a frequency that is associated with a certain channel, and the frequency to which each tuner 205 is tuned may be controlled by requests received from user input to the multimedia device 105 or requests received from one or more client devices 110 of FIG. 1 through the client interface 210. It should be understood that each of the one or more tuners 205 can be tuned to a different channel, and that one or more of the tuners may be considered free or available when the one or more tuners are not tuned to a frequency of a channel that has been requested for output to a client device 110, recording at the multimedia device 105, or other purpose. In embodiments, a subscriber request can cause a tuner 205 to reserve a period of time during which the tuner 205 is to be tuned to a channel specified in the subscriber request (e.g., where a subscriber schedules a program to be recorded at the multimedia device 105 or a client device 110). Content received at the multimedia device 105 may be output to one or more displays or one or more client devices 110 through the client interface 210 (e.g., via DLNA streaming).

In embodiments, a content request (e.g., a request for live or stored content received from a designated channel or received in an IP packet stream) can be received through the client interface 210 from a client device 110 of FIG. 1 as a URI request. In embodiments, the URI request may be a character string identifying a network resource, a channel, specific content, and/or content sources. For example, the URI request can identify a channel and/or content within a channel and/or content directory.

In embodiments, a CDS directory stored at the CDS channel data store 225 may be accessed by a requesting client device 110 to identify an available channel number. The CDS module 215 may access the CDS channel data store 225 to identify a frequency associated with a channel through which to receive a program or content associated with a URI request received from a client device 110. For example, the CDS directory may associate a URI request with a virtual channel number (VCN) that is designated for identifying a specific channel or frequency to which a tuner 205 may be tuned for receiving content delivered over the specific channel or frequency.

In embodiments, the CDS module 215 may carry out a prime and update method for generating and/or updating a channel directory (e.g., CDS directory) stored at the CDS channel data store 225. This prime and update method may be carried out by the CDS module 215 as a background operation (e.g., as one or more tuners 205 become available). When DLNA is enabled on the multimedia device 105, the CDS module 215 may use any available (e.g., unused or free) tuner to tune to each of the channels in a virtual channel number (VCN) list (e.g., channel list stored at the VCN channel data store 220) one by one. Once tuned to a channel, the CDS module 215 may determine the validity, authorization, rights information, media format, media details, and/or various other information or properties associated with the channel. The CDS module 215 may then use the determined properties of each channel when listing each channel in a content directory service (CDS) directory item. When listing each channel in the CDS directory, the CDS module 215 may use one or more of the properties of each respective channel to position the respective channel in an appropriate directory (as opposed to a linear listing). It should be understood that the channel may be listed within the CDS directory under various other heading or subheading designations associated with a variety of channel attributes.

In embodiments, the CDS module 215 may be configured to carry out a learn, update, and publish method of generating and/or updating a channel directory. The learn, update, and publish method may be carried out by the CDS module 215 as a foreground operation (e.g., information is gathered as a tuner is actively tuned to a channel). Once a particular channel is successfully tuned by a client device 110 through a tuner 205 all channel attributes (e.g., validity, authorization, rights information, media format, media details, and/or various other information or properties associated with the channel) are determined, and the CDS module 215 may position the channel in an appropriate directory (instead of a linear listing) based on one or more of the properties of the channel. The CDS module 215 may publish a standard CDS update event and one or more client devices 110 can reload the CDS to retrieve the updated listing of channels.

The one or more attributes or properties determined for a channel may be stored persistently within a CDS directory at the CDS channel data store 225. When a tuner 205 is tuned to a channel, the CDS module 215 may retrieve current attributes or properties from the channel, and the current attributes or properties may be compared to the stored attributes or properties. If any changes between the current and the stored properties exist, the CDS module 215 may update the stored channel properties and may publish a standard CDS update event. In response to receiving a CDS update event, the one or more client devices 110 may reload the CDS directory to retrieve the updated listing of channels.

In embodiments, the CDS module 215 may publish the CDS directory such that all channels are published as being protected (this may be the default setting of the multimedia device 105), or the CDS module 215 may publish the CDS directory such that all channels are published as unprotected, but controlled before streaming.

Figure 3:
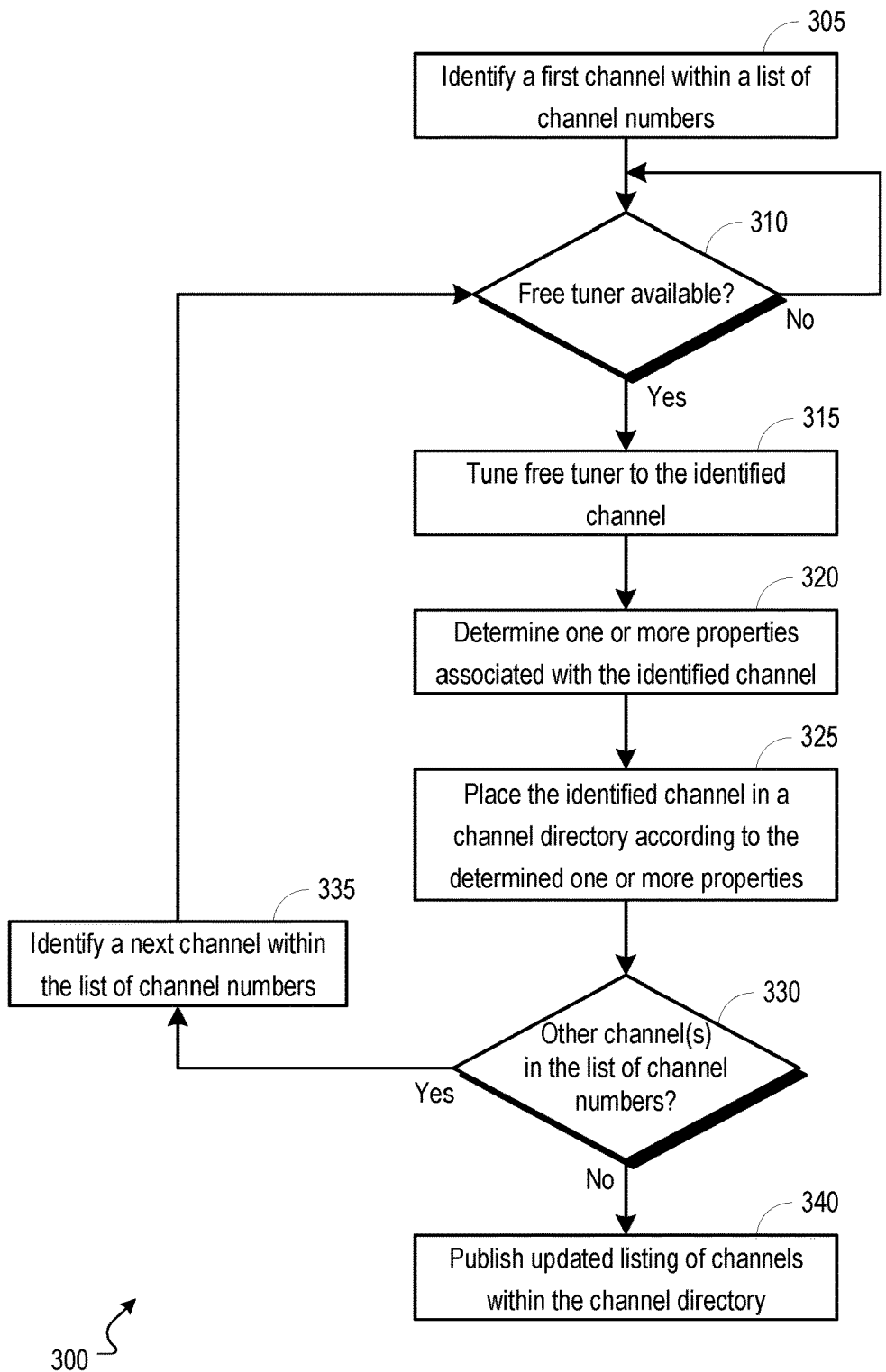
FIG. 3 is a flowchart illustrating an example process operable to facilitate the generation of a channel directory on a per channel basis for output to a device.

FIG. 3 is a flowchart illustrating an example process 300 operable to facilitate the generation of a channel directory on a per channel basis for output to a device. The process 300 may be carried out, for example, by a multimedia device 105 of FIG. 1 or any other device configured to deliver multimedia to one or more client devices 110 of FIG. 1. The process 300 can begin at 305, when a first channel is identified from within a list of channel numbers. The first channel may be identified, for example, by a CDS module 215 of FIG. 2, and the channel may be identified from a VCN list (e.g., VCN list stored at the VCN channel data store 220 of FIG. 2).

At 310, a determination may be made whether a free tuner is available. As an example, the CDS module 215 may check whether one or more tuners of a multimedia device 105 (e.g., tuner(s) 205 of FIG. 2) are available. For example, the CDS module 215 may determine whether at least one tuner is not currently occupied with a subscriber request for retrieving content from a certain channel. If the determination is made that no free tuner is available, the multimedia device 105 (i.e., the CDS module 215) may continue to monitor the one or more tuners of the device until a free tuner becomes available.

If, at 310, the determination is made that at least one free tuner is available, the process 300 may proceed to 315. At 315, the free tuner may be tuned to the identified channel.

At 320, one or more properties associated with the identified channel may be determined. The one or more properties of the identified channel may be determined, for example, by the CDS module 215. Once a tuner 205 is tuned to a channel, the CDS module 215 may recover, from a signal received over the channel, various information including, but not limited to confirmation of validity, authorization information, rights (i.e., digital rights, copy control information (CCI), etc.) information, media format (e.g., resolution), parental control information, and others.

At 325, the identified channel may be placed at a location within a channel directory according to one or more of the determined properties of the channel. For example, the identified channel may be placed at a location within a CDS directory (e.g., channel directory stored at the CDS channel data store 225 of FIG. 2) by the CDS module 215 of FIG. 2. In embodiments, the CDS directory may include one or more headings and/or sub-headings, and the identified channel may be placed under a heading or sub-heading according to the determined one or more properties. As an example, where the identified channel is determined to be invalid, the channel may be listed under a directory heading designated for invalid channels. As another example, the identified channel may be listed within the CDS directory underneath a heading or sub-heading designated for the media format (e.g., high-definition, standard definition, audio channel, etc.). It will be understood by those skilled in the relevant art that a channel may be listed within a CDS directory according to any of the one or more properties associated with the channel.

At 330, a determination may be made whether another channel is found in the list of channels. For example, the CDS module 215 of FIG. 2 may check the VCN list (e.g., VCN list stored at the VCN channel data store 220 of FIG. 2) for any other channels that have not been located within the CDS directory. If the determination is made that at least one channel within the VCN list has not been located within the CDS directory, the process 330 may proceed to 335.

At 335, a next channel may be identified from within the list of channel numbers. The next channel may be identified, for example, by a CDS module 215 of FIG. 2, and the channel may be identified from a VCN list (e.g., VCN list stored at the VCN channel data store 220 of FIG. 2). After the next channel is identified, the process 300 may return to 310 where the determination may be made whether a free tuner is available.

Returning to 330, if the determination is made that no other unplaced channels (i.e., channels not yet located within the channel directory according to one or more associated properties) are found in the list of channel numbers, the process 300 may proceed to 340. At 340, the updated listing of channels within the channel directory may be published. The updated listing of channels within the channel directory may be published, for example, by the CDS module 215. In embodiments, the CDS module 215 may store the updated channel directory at the multimedia device 105 (e.g., at the CDS channel data store 225 of FIG. 2). The CDS module 215, or the CDS channel data store 225, may periodically, or upon a request, push the updated channel directory to one or more client devices 110 configured to receive communications from the multimedia device 105. The CDS module 215 may output a notification to one or more client devices 110 informing the client devices 110 that the updated channel directory is available, and, in response, the client devices 110 may individually request delivery of the updated channel directory. The CDS module 215 may publish within the CDS that all channels are protected (i.e., encrypted), so only DLNA-DTCP capable clients can retrieve and decrypt the content, or the CDS module 215 may publish within the CDS that all channels are unprotected (i.e., unencrypted) but controlled before streaming.

Figure 4:
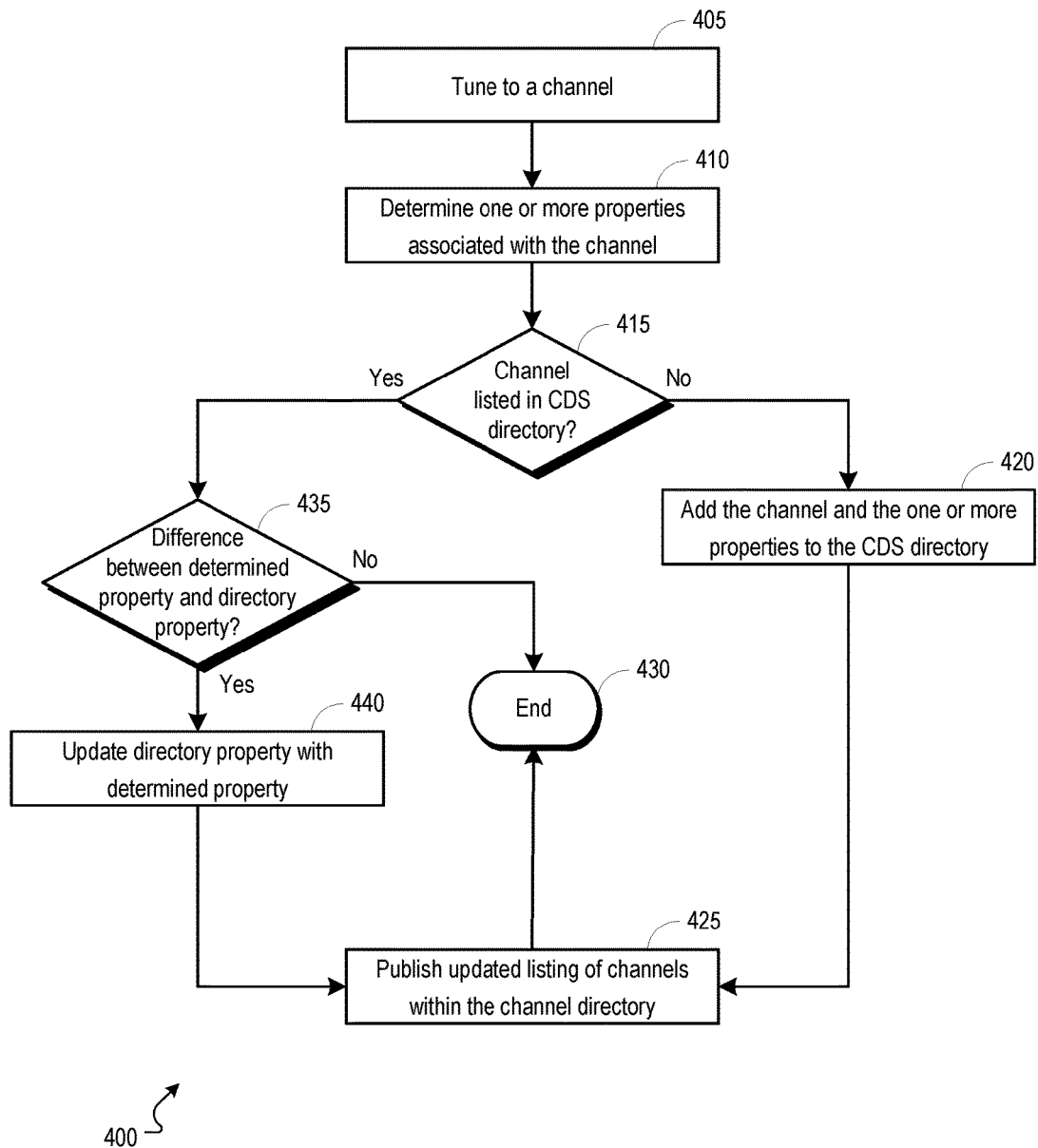
FIG. 4 is a flowchart illustrating an example process operable to facilitate the updating of a channel directory on a per channel basis for output to a device.

FIG. 4 is a flowchart illustrating an example process 400 operable to facilitate the updating of a channel directory on a per channel basis for output to a device. The process 400 may be carried out, for example, by a multimedia device 105 of FIG. 1 or any other device configured to deliver multimedia to one or more client devices 110 of FIG. 1. The process 400 can begin at 405, when a tuner (e.g., tuner 205 of FIG. 2) is tuned to a channel. In embodiments, a tuner of a multimedia device 105 may be tuned to a channel in response to a request from a user or a request from a client device 110 of FIG. 1 configured to receive content from the multimedia device 105.

At 410, one or more properties associated with the channel may be determined. The one or more properties of the channel may be determined, for example, by the CDS module 215. Once a tuner 205 is tuned to a channel, the CDS module 215 may recover, from a signal received over the channel, various information including, but not limited to confirmation of validity, authorization information, rights (i.e., digital rights, copy control information (CCI), etc.) information, media format (e.g., resolution), parental control information, and others. As an example, when a user tunes a tuner 205 to a parentally controlled channel and inputs a valid password or PIN, the CDS module 215 may determine that the channel is a restricted channel (as opposed to an invalid or unavailable channel).

At 415, a determination may be made whether the channel is currently listed within a channel directory. For example, the CDS module 215 of FIG. 2 may check a CDS directory (e.g., CDS directory stored at the CDS channel data store 225 of FIG. 2) for a listing of the channel.

If, at 415, the determination is made that the channel is not listed within the CDS directory, the process 400 may proceed to 420. At 420, the channel and one or more of the properties associated with the channel may be added to the CDS directory. For example, the CDS module 215 of FIG. 2 may add the channel, and one or more properties, to the CDS directory stored at the CDS channel data store 225 of FIG. 2. In embodiments, the channel may be placed at a location within the CDS directory according to one or more of the determined properties of the channel. The CDS directory may include one or more headings and/or sub-headings, and the channel may be placed under a heading or sub-heading according to the determined one or more properties. As an example, where the channel is determined to be invalid, the channel may be listed under a directory heading designated for invalid channels. As another example, the channel may be listed within the CDS directory underneath a heading or sub-heading designated for the media format (e.g., high-definition, standard definition, audio channel, etc.). It will be understood by those skilled in the relevant art that a channel may be listed within a CDS directory according to any of the one or more properties associated with the channel.

At 425, the updated listing of channels within the channel directory may be published. The updated listing of channels within the channel directory may be published, for example, by the CDS module 215. In embodiments, the CDS module 215 may store the updated channel directory at the multimedia device 105 (e.g., at the CDS channel data store 225 of FIG. 2). The CDS module 215, or the CDS channel data store 225, may periodically, or upon a request, push the updated channel directory to one or more client devices 110 configured to receive communications from the multimedia device 105. The CDS module 215 may output a notification to one or more client devices 110 informing the client devices 110 that an update has been made to the channel directory and that the updated channel directory is available, and, in response, the client devices 110 may individually request delivery of the updated channel directory. The CDS module 215 may publish within the CDS that all channels are protected (i.e., encrypted), so only DLNA-DTCP capable clients can retrieve and decrypt the content, or the CDS module 215 may publish within the CDS that all channels are unprotected (i.e., unencrypted) but controlled before streaming. After the updated listing of channels within the channel directory is published, the process 400 may end at 430.

Returning to 415, if the determination is made that the channel is listed within the CDS directory, the process 400 may proceed to 435. At 435, a determination may be made whether there is a difference between a determined property of the channel (i.e., a property as determined at 410) and a corresponding property as the property exists within the CDS directory.

For example, the CDS module 215 of FIG. 2 may compare one or more of the properties determined for the channel to corresponding properties as currently found within the CDS directory (e.g., CDS directory stored at the CDS channel data store 225 of FIG. 2). In embodiments, the CDS module 215 may identify a property that is used to place the channel underneath a heading or sub-heading of the directory (e.g., unavailable, high-definition, standard definition, digital rights protection enabled, parental control enabled, etc.). If there are no differences between the one or more determined properties and the one or more existing properties, the process 400 may end at 430.

If, at 435, a difference is found between a determined property (i.e., property determined at 410) and an existing property (i.e., property as currently stored within the CDS directory) of the channel, the process 400 may proceed to 440. At 440, the one or more channel properties within the CDS directory may be updated with the corresponding channel properties as determined at 410. In embodiments, the location of the channel within the directory may be changed according to the determined property. For example, the channel may be moved underneath a heading or sub-heading that matches the determined property. Once the update to the directory is complete, the updated listing of channels within the channel directory may be published at 425.

Figure 5:
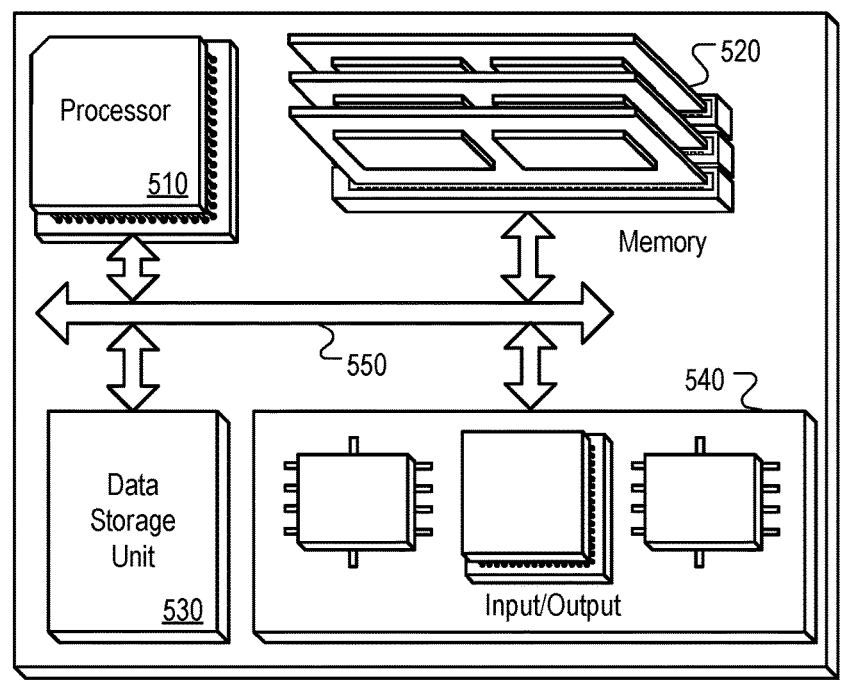
FIG. 5 is a block diagram of a hardware configuration operable to facilitate the generation and/or update of a channel directory on a per channel basis for output to a device.

FIG. 5 is a block diagram of a hardware configuration 500 operable to facilitate the generation and/or update of a channel directory on a per channel basis for output to a device. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In one implementation, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 110 of FIG. 1 (e.g., television, mobile device, tablet, computer, STB, etc.). In another implementation, the input/output device can include driver devices configured to send communications to, and receive communications from one or more networks (e.g., subscriber network 120 of FIG. 1, WAN 115 of FIG. 1, local network 125 of FIG. 1, etc.).

Those skilled in the art will appreciate that the invention improves upon methods and systems for delivering a channel directory to client devices. Methods, systems, and computer readable media can be operable to facilitate the generation and/or update of a channel directory on a per channel basis for output to a device. In embodiments, a multimedia device may generate and update a channel directory using one or more channel attributes that are retrieved while tuned to each individual one channel of a group of channels. The multimedia device may generate and update the channel directory as one or more background operations by using a free tuner to tune to each channel. The multimedia device may position each channel within the channel directory according to one or more attributes associated with the channel. In embodiments, the multimedia device may update the channel directory when a tuner is actively tuned to a channel and the determination is made that one or more attributes of the channel have changed.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
   determining that a tuner of a multimedia device is available;
   tuning the tuner to a channel identified from a list of channels;
   while the tuner is tuned to the identified channel, determining one or more properties associated with the identified channel, wherein the one or more properties comprise a media format associated with the identified channel, and wherein the one or more properties are recovered from a signal that is received over the identified channel;
   identifying from within a content directory service (CDS) directory, a heading corresponding with at least one of the determined one or more properties of the identified channel, wherein the heading comprises an identifier associated with the media format that is associated with the identified channel;
   updating the content directory service (CDS) directory by adding an identifier associated with the identified channel underneath the heading corresponding with at least one of the determined one or more properties of the identified channel;
   for each respective one client device of one or more client devices, wherein the one or more client devices are configured to request and receive multimedia from the multimedia device:
   if the respective client device supports digital transmission content protection, publishing the updated content directory service (CDS) directory to the respective client device, wherein all channels are published as protected channels in the content directory service (CDS) directory, but controlled before streaming; and
   if the respective client device does not support digital transmission content protection, publishing the updated content directory service (CDS) directory to the respective client device, wherein all channels are published as unprotected channels in the content directory service (CDS) directory, but controlled before streaming.

2. The method of claim 1, wherein the tuner is tuned to the identified channel as a background operation.

3. The method of claim 1, wherein each channel within the content directory service (CDS) directory is published as being protected.

4. The method of claim 1, wherein each channel within the content directory service (CDS) directory is published as being unprotected.

5. The method of claim 4, wherein the determined one or more properties associated with the identified channel comprise copy control information, and wherein a subsequent determination whether to stream content from a channel within the content directory service (CDS) directory to a client device is based upon the copy control information.

6. The method of claim 1, further comprising:
   receiving a user request to tune to a certain channel;
   tuning the tuner to the certain channel;
   while the tuner is tuned to the certain channel, determining one or more properties associated with the certain channel;
   comparing one or more of the determined one or more properties associated with the certain channel to one or more previously determined properties associated with the certain channel;
   determining that one or more of the properties are different from one or more previously determined properties associated with the certain channel, and updating the one or more properties of the certain channel within the content directory service (CDS) directory using the one or more determined properties.

7. An apparatus comprising:
   one or more tuners, wherein each respective one tuner is configured to be tuned to receive a signal associated with a designated channel; and
   a content directory service module circuitry configured to:
   determine that at least one of the one or more tuners is available;
   tune the available tuner to a channel identified from a list of channels;
   while the available tuner is tuned to the identified channel, determine one or more properties associated with the identified channel, wherein the one or more properties comprise a media format associated with the identified channel, and wherein the one or more properties are recovered from a signal that is received over the identified channel;
   identify from within a content directory service (CDS) directory, a heading corresponding with at least one of the determined one or more properties of the identified channel, wherein the heading comprises an identifier associated with the media format that is associated with the identified channel;
   update the content directory service (CDS) directory by adding an identifier associated with the identified channel underneath the heading corresponding with at least one of the determined one or more properties of the identified channel;
   for each respective one client device of one or more client devices, wherein the one or more client devices are configured to request and receive multimedia from the multimedia device:
   if the respective client device supports digital transmission content protection, publish the updated content directory service (CDS) directory to the respective client device, wherein all channels are published as protected channels in the content directory service (CDS) directory, but controlled before streaming; and
   if the respective client device does not support digital transmission content protection, publish the updated content directory service (CDS) directory to the respective client device, wherein all channels are published as unprotected channels in the content directory service (CDS) directory, but controlled before streaming.

8. The apparatus of claim 7, further comprising:
   an interface configured to be used to receive a user request to tune to a certain channel; and
   wherein the content directory module is further configured to:
   tune one of the one or more tuners to the certain channel;
   while the tuner is tuned to the certain channel, determine one or more properties associated with the certain channel;
   compare one or more of the determined one or more properties associated with the certain channel to one or more previously determined properties associated with the certain channel;
   determine that one or more of the properties are different from one or more previously determined properties associated with the certain channel, and update the one or more properties of the certain channel within the content directory service (CDS) directory using the one or more determined properties.

9. One or more non-transitory computer readable media having instructions operable to cause one or more processors to perform operations comprising:
- determining that a tuner of a multimedia device is available;
- tuning the tuner to a channel identified from a list of channels;
- while the tuner is tuned to the identified channel, determining one or more properties associated with the identified channel, wherein the one or more properties comprise a media format associated with the identified channel, and wherein the one or more properties are recovered from a signal that is received over the identified channel;
- identifying from within a content directory service (CDS) directory, a heading corresponding with at least one of the determined one or more properties of the identified channel, wherein the heading comprises an identifier associated with the media format that is associated with the identified channel;
- updating the content directory service (CDS) directory by adding an identifier associated with the identified channel underneath the heading corresponding with at least one of the determined one or more properties of the identified channel;
- for each respective one client device of one or more client devices, wherein the one or more client devices are configured to request and receive multimedia from the multimedia device:
- if the respective client device supports digital transmission content protection, publishing the updated content directory service (CDS) directory to the respective client device, wherein all channels are published as protected channels in the content directory service (CDS) directory, but controlled before streaming; and
- if the respective client device does not support digital transmission content protection, publishing the updated content directory service (CDS) directory to the respective client device, wherein all channels are published as unprotected channels in the content directory service (CDS) directory, but controlled before streaming.

10. The one or more non-transitory computer-readable media of claim 9, wherein the tuner is tuned to the identified channel as a background operation.

11. The one or more non-transitory computer-readable media of claim 9, wherein each channel within the content directory service (CDS) directory is published as being protected.

12. The one or more non-transitory computer-readable media of claim 9, wherein each channel within the content directory service (CDS) directory is published as being unprotected.

13. The one or more non-transitory computer-readable media of claim 12, wherein the determined one or more properties associated with the identified channel comprise copy control information, and wherein a subsequent determination whether to stream content from a channel within the content directory service (CDS) directory to a client device is based upon the copy control information.

14. The one or more non-transitory computer-readable media of claim 9, wherein the instructions are further operable to cause one or more processors to perform the operations comprising:
- receiving a user request to tune to a certain channel;
- tuning the tuner to the certain channel;
- while the tuner is tuned to the certain channel, determining one or more properties associated with the certain channel;
- comparing one or more of the determined one or more properties associated with the certain channel to one or more previously determined properties associated with the certain channel;
- determining that one or more properties are different from one or more previously determined properties associated with the certain channel, and updating the one or more properties of the certain channel within the content directory service (CDS) directory using the one or more determined properties.

\* \* \* \* \*